Patented Oct. 13, 1925.

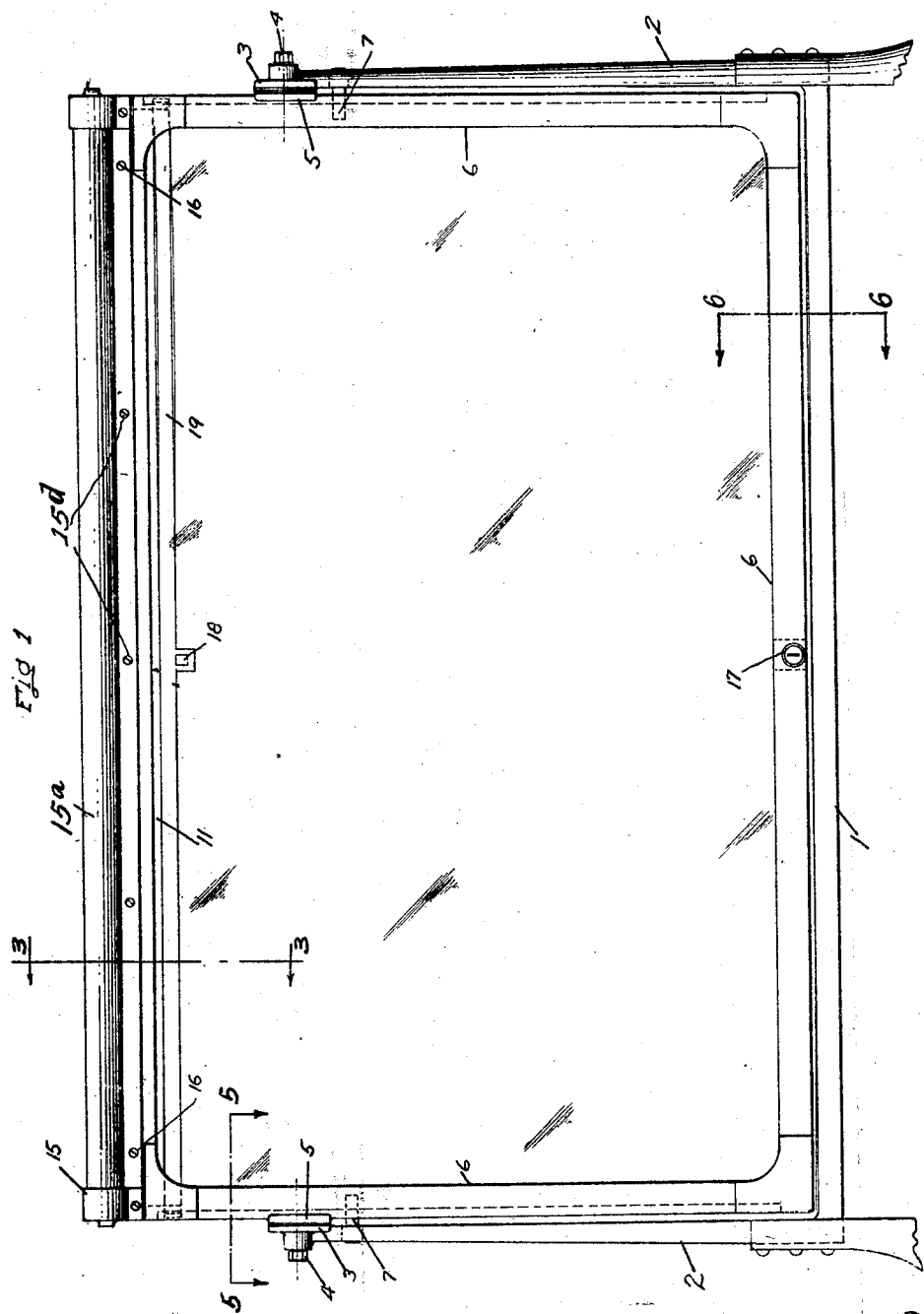

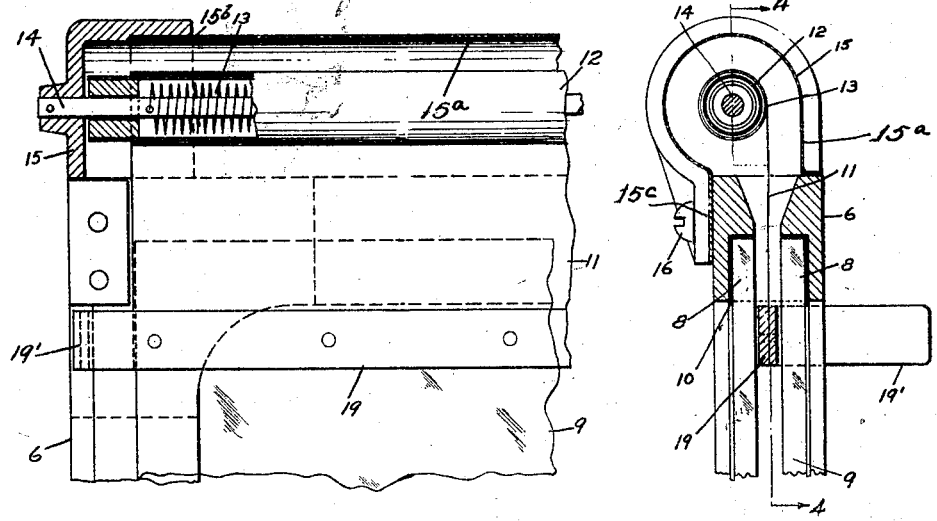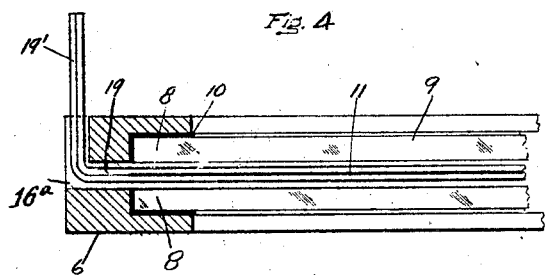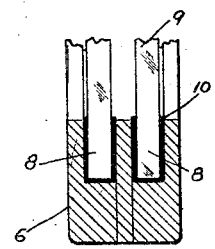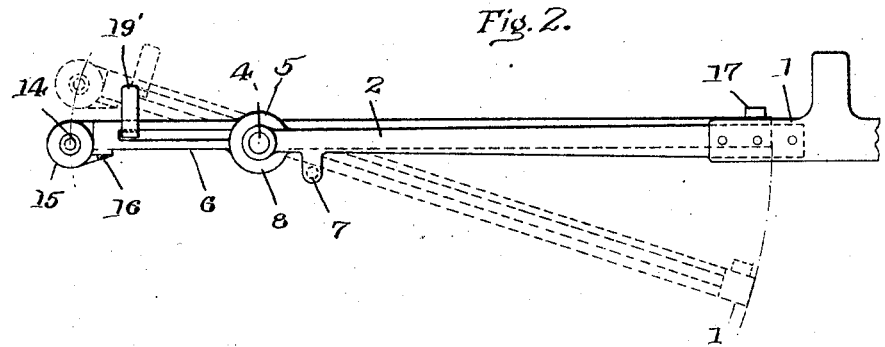

1,557,167

UNITED STATES PATENT OFFICE.

EDWIN HERBERT IVES, OF SAN FRANCISCO, CALIFORNIA.

THEFT-INDICATING WINDSHIELD FOR VEHICLES.

Application filed November 16, 1922. Serial No. 601,432.

*To all whom it may concern:*

Be it known that I, EDWIN HERBERT IVES, a citizen of the United States, residing at No. 2812 Greenwich Street, in the city and county of San Francisco, State of California, have invented new and useful Theft-Indicating Windshields for Vehicles, of which the following is a specification.

This invention relates to curtains or wind shields for automobiles.

The general object of the invention is to provide a rolling curtain which is adapted for use in connection with the windshield of an automobile wherein the curtain may be readily moved to position to indicate unauthorized driving of the vehicle.

A further object of the invention is to provide an automobile having two transparent panels with a curtain mounted to move between the panels in such a manner that the curtain can be moved to obstruct vision through the panels and can be secured when in that position.

A further object of the invention is to provide wind shields for automobiles comprising a plurality of thicknesses of glass with a sliding curtain movable between the sheets of glass wherein the parts are so arranged that the curtain can be securely locked against tampering with, when desired.

A further object of the invention is to provide a wind shield for automobiles with a sliding curtain wherein the curtain moves between two thicknesses of transparent panels and wherein a protruding handle allows the curtain to be shifted but prevents access to the curtain.

The invention consists of the features of construction and combination of parts hereinafter described and claimed.

In the accompanying drawings illustrating the invention, Fig. 1, is a front elevation of a windshield constructed in accordance with the invention, with certain minor details omitted for convenience of illustration. Fig. 2, is an end view with certain minor details omitted. Fig. 3, is a longitudinal section on the line 3—3 of Fig. 1, viewed in the direction of the arrows. Fig. 4, is a transverse section on the line 4—4 of Fig. 3, viewed in the direction of the arrows. Fig. 5, is a horizontal transverse section on line 5—5, Fig. 1 and Fig. 6, is a transverse section on the line 6—6 of Fig. 1.

The invention relates to panels of wind shields for automobiles wherein a frame which may be of metal is provided with two thicknesses of plate glass or other transparent material. Sufficient space is maintained between said transparent plates to allow an opaque curtain or blind to be drawn between them. The curtain when drawn, interferes with the driver's vision making the operation of the vehicle to which the same is attached extremely hazardous and thereby making the theft of same highly improbable.

The curtain when moved to operative position is preferably held by fastening means such as a snap lock which when unlocked by a key, causes the said curtain to roll up out of sight. This action is brought about by a spring winding roller located above the transparent plates.

Referring to the drawings which illustrate one embodiment of my invention 1 indicates an outer frame having two vertical supporting members 2 secured thereto. The supporting members 2 are shown as provided with attached hinge plates 3 shown as provided with hinge pins 4 which are adapted to engage companion hinge plates 5 mounted on an adjustable frame 6. The frame 6 is indicated as comprising a rectangular shaped body having opposed parallel, vertical and horizontal, members.

The frame 6 is adapted to swing on the pivot pin 4 and in order to limit the swinging movement of this frame I provide stop members 7 which are shown as fastened on each side of the frame 1 and which are locked in a position to prevent the frame 6 from being swung more than a few degrees from the vertical or closed position. The frame is shown in dotted lines in Fig. 2 as swung to the outward limit of its movement.

The frame 6 which as stated is preferably made of metal is shown as provided with a plurality of adjacent grooves 8. The grooves 8 are adapted to receive transparent plates 9 which are preferably made of plate glass and which may be slid into the grooves 8 and may be held tight against rattling by suitable cushions or packing material 10.

The plates 9 are spaced apart in order that an opaque flexible curtain 11 may be drawn between the plates of glass. This curtain 11 is mounted on a hollow roller 12 which may be similar to a window shade roller, and which is shown as provided with a winding spring 13 thereon. The winding spring 13 is indicated as fixed on a non-rotatable shaft 14 shown as fastened in the ends of a roll housing 15 which may be mounted at each end of the frame 6.

The roll housing 15 is adapted to be removably secured to the frame 6 by fastening members shown as screws 16. When for any occasion the operator wishes to remove the housing 15 and the roller 12 the screws 16 are loosened and the housing is lifted from its support.

In order to protect the roller from accidental or unauthorized injury, I provide a protecting member 15$^a$ which extends from one housing 15 to the other housing and which is shown as fitting in a rabbet 15$^b$ in the housing. The portion 15$^a$ is bent down as shown at 15$^c$ in Fig. 3 and this bent down portion may be secured in place by screws 15$^d$.

The vertical portions of the frame 6 are provided with recesses 16$^a$. The lower portion of the curtain 11 is provided with a curtain bar 19 which extends across the curtain. This curtain bar 19 is provided at its opposite ends with handle members 19'. The handle members 19' are shown as extended through the slots or recesses 16$^a$ and are arranged at each side of the curtain to allow the operator to grasp the handles and thus move the curtain. The frame 6 is provided with a locking member 17 thereon and the curtain bar is provided with a companion locking member or eye 18. When the curtain 11 is moved downwardly by means of the handles 19' the locking member 18 will engage the lock 17 which is preferably of the snap fastening variety and thereby prevent raising of the curtain until the proper key is inserted into the lock 17 and the curtain released.

The curtain described is preferably made of flexible opaque material so that the operator may use it as a sun shade as well as for a theft indicating device.

It will be understood that the foregoing description is merely indicative of one of a number of ways in which my invention can be utilized. It will be apparent that I have provided an improved curtain for automobiles which is extremely simple in operation, which can be economically manufactured and which is not likely to get out of order.

I claim:

1. The combination in a shield for motor vehicles, of a frame mounted on said vehicle, a pair of transparent panels secured in said frame, said panels being spaced apart, a flexible curtain disposed at one end of said panels and adapted to have its free end moved between the panels toward the other end thereof, a lock on said frame and a coacting member on said curtain.

2. The combination in a shield for motor vehicles, of a frame mounted on said vehicle, a front transparent panel secured in said frame, a rear transparent panel, said panels being spaced apart, a flexible curtain disposed between said panels and adapted to have its free end moved between the panels toward the other end thereof, an operating member on said curtain, there being a slot adjacent said rear transparent panel through which said operating member projects.

3. In a device of the class described, a shield comprising a frame having a pair of spaced transparent panels secured thereon, a shaft mounted on said frame, an opaque curtain mounted on said shaft to move between said spaced panels, said shield having a slot therein, a rigid member extending across the lower portion of said curtain, said rigid member having a handle thereon protruding through said slot whereby the curtain may be moved, and means on said rigid member to lock said curtain in adjusted position.

4. In a device of the class described, a frame, a pair of transparent panels secured in said frame, said panels being spaced apart, a spring roller mounted on said frame, a cover completely enclosing said roller, an opaque curtain mounted on said roller to move between said spaced panels, said frame having a slot therein and a rigid member extending across the lower portion of said curtain, said rigid member having a handle thereon protruding through said slot, whereby the curtain may be moved.

5. A wind shield for motor vehicles comprising a frame mounted for angular movement on said vehicle, a pair of spaced transparent panels secured in said frame, a shaft secured on said frame, a spring-roller mounted on said shaft, a curtain mounted on said roller to move between said spaced panels, said curtain having a bar at one end, means on said bar for operating the curtain and a lock for holding the curtain in adjusted position.

6. A wind shield for motor vehicles comprising a frame, a pair of transparent panels secured in said frame, said panels being spaced apart, a housing at each end of the frame, a shaft secured in said housing, a spring roller mounted on said shaft, a flexible curtain mounted on said roller, said curtain when unrolled being arranged between said panels, said curtain having a bar at one end, an operating handle on said bar, said frame having a slot therein through which said handle projects, a lock on said frame, and a member secured on said bar and co-acting with said lock.

7. A wind shield for motor vehicles comprising a frame mounted for angular movement on said vehicle, a pair of transparent panels secured in said frame, said panels being spaced apart, a housing at each end of the frame, a shaft secured to said housing, a roller mounted on said shaft, a flexible curtain mounted on said roller, said curtain when unrolled being arranged between said panels, said curtain having a bar at one end, an operating handle at each end of said bar, said frame having slots at each side therein through which said handles project, a lock on said frame, a member coacting with said lock and mounted on said bar and means for rolling up the curtain.

EDWIN HERBERT IVES.